May 1, 1951 F. J. M. THEUNISSEN 2,551,304
DEVICE FOR THE SELECTIVE OPENING OF CIRCUIT BREAKERS
PROTECTING INSTALLATIONS
Filed Dec. 3, 1945
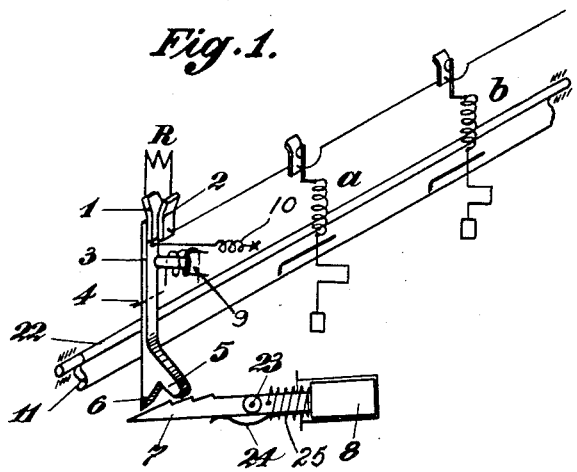
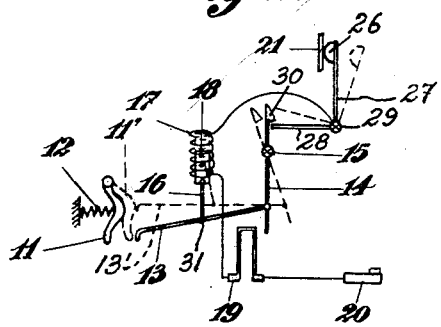
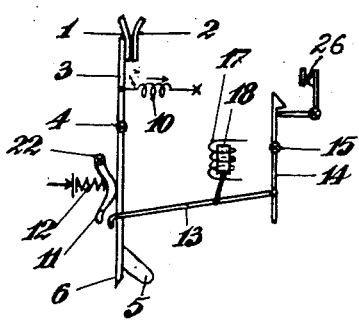 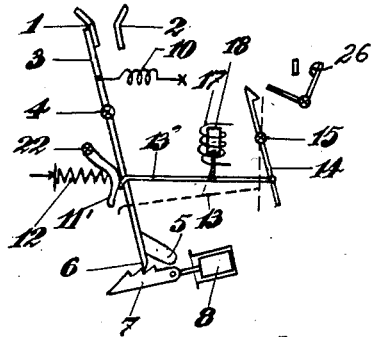
Inventor
FRANCOIS JEAN MARIE THEUNISSEN
By Haseltine, Lake & Co.
Attorneys Patented May 1, 1951

2,551,304

UNITED STATES PATENT OFFICE 2,551,304

DEVICE FOR THE SELECTIVE OPENING OF CIRCUIT BREAKERS PROTECTING INSTALLATIONS

François Jean Marie Theunissen, Brussels, Belgium

Application December 3, 1945, Serial No. 632,443
In Belgium January 25, 1944

Section 1, Public Law 690, August 8, 1946
Patent expires January 25, 1964

5 Claims. (Cl. 200—98)

This invention relates to devices for the selective opening of electric circuit-breakers protecting installations.

When in an installation several circuit-breakers or cut-outs are placed in series, one for example serving as general circuit breaker, and the others protecting the several circuits, it often occurs that in case of a heavy overload or short-circuit on any one of the circuits, not only the cut-out protecting this particular circuit opens, but also the main or general cut-out, thus breaking the current flow in the whole installation.

The present invention has for its object to afford an arrangement such that undesired overload current flowing in a given circuit, may be broken by that circuit cut-out which controls this circuit, whilst heavy overloads or short-circuits are cut exclusively and instantaneously by the general circuit breaker, which opens the circuit for a very short time but which is sufficient for the branch cut-out affected by the short-circuit to be opened. To attain this object following the principles of the invention the general circuit breaker is connected mechanically to the various branch cut-outs in such manner that in the case of a heavy overload or of a short-circuit in the branch circuit, the branch cut-out corresponding thereto only opens after the opening of the general or main cut-out. According to the invention, furthermore, the general cut-out closes automatically, immediately after the opening of the branch cut-out affected by the short-circuit, in such manner as to interrupt the current in the installation only for a very short time.

The element which is called the "general circuit-breaker" may be constituted advantageously by a contact bridge actuated directly by the electromagnet controlling the general circuit.

As the branch cut-outs each controlling circuits will not, in general, have to cut off very important currents, they may be of very simple design and construction. Furthermore, although the description which follows shows that as all the elements form part of a unit, the complete device may be such as to conform with the requirements of practice.

By way of example, an embodiment of the invention is described hereafter with reference to the annexed drawings in which:

Figure 1 shows diagrammatically in perspective the device applied to a single phase, or pole, it being understood that it can be applied to each pole individually with single pole apparatus or to several poles by means of multipolar apparatus.

Figure 2 shows diagrammatically by way of example, the manner in which the general circuit-breaker opens the branch cut-out, the circuit of which has caused the operation of the general circuit-breaker.

Figures 3 and 4 show diagrammatically how the general circuit-breaker is in mechanical connection with the various branch cut-outs. In Figure 3, it is assumed that the general circuit breaker is closed; and in Figure 4 it is assumed open, due to a short-circuit which has been produced in the circuit of the branch cut-out, the disconnecting bar 13' being shown on the diagram in full lines, the bars of the other cut-outs being shown dotted at 13.

In Figure 1, 1 and 2 are the principal contacts of the general circuit-breaker through which the current passes. $a, b$ . . . are branch cut-outs each protecting an output to a corresponding branch circuit. The device may comprise any number of branch cut-outs or may even only comprise a single one.

1 is the movable contact carried by the arm 3 of the general circuit-breaker. The arm 3 pivots about the fixed axis 4 and terminates in a cam or boss 5 and a nose piece 6.

7 is a toothed catch pivotally connected at 23 to a dashpot 8 the movable part of which is subjected to the action of a spring 25 tending to displace said part to the right hand side in drawing. A spring 24 attached to the dashpot opposes the downward movement of the catch 7. An electromagnet 9 is arranged adjacent arm 3. Its magnetising coil has one end attached to the axis 4 and its other end to the current network. A spring 10 acts upon the arm 3 to close the contact 1 and 2. A bar 11 rotatably mounted on an axis 22 is constantly held against the arm 3 by a spring 12. This bar extends along the several branch cut outs and is provided with bosses of appropriate profile opposite each branch cut-out to cooperate therewith in a manner that be further described hereafter.

Each branch cut-out comprises the following elements. A fixed contact 21 is connected to the supply line controlled by the general circuit breaker 1, 2. A movable contact 26 cooperating with the fixed contact 21 and having a tendency to move away from the latter, is mounted on one arm 27 of an angle lever 27, 28 pivotally mounted at a fixed point 29. A latch mechanism formed by a lever 14 pivoting about a fixed point 15 has a hook 30 which is arranged to one end of the lever 14 and normally engages the end of the arm 28 to hold the movable contact 26 against the fixed contact 21. A connecting rod 13 is pivotally connected at one end to the other end of the latch 14 and an intermediate point 31 to a rod 16 connected to the core 18 of an electromagnet 17. A current output terminal 20 is connected to the circuit controlled by the branch cut-out. The other end of the rod 13 is so positioned that when the said rod is displaced by the electromagnet 17, 18 into the position 13', the said end is brought into a position lying in the path of movement of the bar 11 when the latter is allowed to become displaced into the position 11', by the spring 12 during the movement of the arm 3 for opening the contact 1. A thermal relay 19 is arranged in such a manner that its free end is capable of cooperating with the end of the ratchet lever 14 that is remote from the hook 30.

When the branch cut-out is closed, electric current flows from the contact 21, 26 through the elements 27, 29, 17, 19 to the terminal 20.

The relay 19 acts in the case of a moderate overload by directly urging the lower end of the lever 14 to the right and permitting the opening of the contact 26, while the electromagnets 9 and 17 act in the case of a heavy overload or short-circuit. In the latter case the operation is as follows:

The electromagnet 17, 18 of the branch circuit in which the short circuit has occurred displaces the rod 13 into the position 13' shown in dotted lines in Fig. 2 and in full in Fig. 4. At the same time the electromagnet 9 displaces the arm 3 to open the contact 1 against the action of the spring 10, thereby engaging its nose piece 6 into one of the teeth of the catch 7. The spring 12 urges the bar 11 into the position 11' shown in dotted lines in Fig. 2 and in full in Fig. 4, which interferes with the position of the end of the rod 13 in the position 13', thereby urging this rod to the right so as to move the lever 14 about its pivot 15 and disengage its hook 30 from the end of the lever arm 28. The angle lever 28, 29 then effects a pivotal movement to the right about its axis 29, for instance under the action of spring means (not shown), to open the contact 26, this position being shown in dotted lines Fig. 2 and in full in Fig. 4. The current in the short-circuited circuit thus being interrupted, the electromagnets 9 and 17, 18 no longer act upon the arm 3 and the rod 13 respectively. The spring 10 then brings the arm 3 back to its initial position, thereby displacing the bar 11 to the left hand side in its initial position.

This return movement is preferably braked by the action of a dash-post 8 and opposing spring 25, to be sure that the contacts 1 and 2 can not close again before the contact 21, 26 has been opened. While the moving to the left from the position shown in Fig. 4, the cam or boss 5 abuts against the catch 7 and causes the latter to rock downwards about the pivot 23 against the opposing action of the spring 24, so as to disengage the nose piece 6. At this moment, closing of the contacts 1 and 2 suddenly takes place. Naturally any other means might be used for braking the return movement of the lever 3 and then suddenly liberating the latter after a certain amount of movement.

Since the current no longer passes through the coil 17, the elements 18, 16, 13, 14 and 30 also return to their initial positions shown in full in Fig. 2, but the elements 26, 27, and 28 remain in the position shown in dotted lines, the contact 21, 26 being open.

It is thus clearly seen firstly, that the branch cut-out will never break a current other than that which is limited by a thermal or like relay and secondly that the general circuit breaker which will have broken the excess current, will itself take charge of opening the branch cut-out of the circuit in which the heavy overload has been produced and only this cut-out, to the exclusion of the others connected on to the same general circuit-breaker, since only the connecting rod 13 of this branch cut-out will be placed in the path of the bar 11 or will come into contact with this latter during its operation.

The faculty circuit being eliminated by its branch cut-out, the whole of the installation with the exception of this circuit will again function normally. In order to avoid any interruption of the current in the other circuits, there may be inserted between the contacts 1 and 2 a resistance R the amount of which must, however, be sufficient to avoid an excessive current in the branch cut-outs. In many cases, a dash-pot or retarding device such as 8 may be dispensed with. Actually, the inertia of the parts to be set in movement in the general circuit-breaker in order to produce the breaking of the current is much greater than that necessary to displace the bar 13 of the branch cut-out, so that this latter will be in a good position to cause the opening of this cut-out, immediately after the breaking of the current has been effected by the general circuit-breaker.

As the damping of the contact 1 has no other object than to assure the opening of the branch cut-out affected by the short-circuit, before the contacts 1 and 2 close again, it will be seen that this damping or braking can in general be dispensed with.

Naturally, without departing from the spirit of the invention, the same could be realised in various constructional forms other than that described above by way of example.

What I claim is:

1. A device, for the selective opening of circuit-breakers each protecting one of a plurality of branch circuits, and comprising a general circuit-breaker, a plurality of branch cut-outs mounted in series with the general circuit-breaker, means for opening the general circuit-breaker responsive to a heavy overload in any one of the branch circuits, individual locking means for retaining each of the branch cut-outs in closed position, a movable control member, means for actuating the control member responsive to opening of the general circuit breaker, a movable liberating member for each branch cut-out operatively connected to the related locking means, and individual means magnetically responsive to the current in the related branch circuit for moving the liberating member to operative position upon the occurrence of a heavy overload in the related branch circuit, the operative position of the liberating member being one in which the member is interposed in the path of movement of the control member thereby to establish a temporary mechanical connection therebetween and to cause the liberation of the locking means of the related branch cut-out in response to movement of the control member.

2. A device as claimed in claim 1 wherein the movable control member comprises an element extending adjacent each branch cut-out in a position where its path of movement will be obstructed by the liberating member of any branch cut-out when in operative position.

3. A device as claimed in claim 1 wherein the general circuit breaker comprises a fixed contact, a movable contact and a movable arm carrying the movable contact, the device further comprising a spring fixed to the movable arm and operatively connected to the control member.

4. A device as claimed in claim 1 further comprising means for automatically closing the general circuit breaker after the opening of any one branch cut-out.

5. A device as claimed in claim 4 further comprising means for retarding the closing of the general circuit breaker.

FRANÇOIS JEAN MARIE THEUNISSEN.

REFERENCES CITED

The following references are of record in the file of this patent:

UNITED STATES PATENTS

| Number | Name | Date |
|---|---|---|
| 957,334 | Henderson | May 10, 1910 |
| 961,164 | Rothwell | June 14, 1910 |
| 1,159,936 | Harris | Nov. 9, 1915 |
| 1,717,260 | Rankin | June 11, 1929 |